(12) United States Patent
Weiss

(10) Patent No.: US 6,837,102 B2
(45) Date of Patent: Jan. 4, 2005

(54) METHOD AND APPARATUS FOR TIRE FLAW DETECTION

(76) Inventor: Arnold A. Weiss, 3141 Dean Ct., #803, Minneapolis, MN (US) 55416

( * ) Notice: Subject to any disclaimer, the term of this patent is extended or adjusted under 35 U.S.C. 154(b) by 0 days.

(21) Appl. No.: 10/406,435

(22) Filed: Apr. 3, 2003

(65) Prior Publication Data
US 2003/0188573 A1 Oct. 9, 2003

Related U.S. Application Data

(60) Provisional application No. 60/371,033, filed on Apr. 9, 2002, and provisional application No. 60/370,170, filed on Apr. 5, 2002.

(51) Int. Cl.⁷ .............................................. G01M 17/02
(52) U.S. Cl. ......................................... 73/146; 324/558
(58) Field of Search .............................. 73/146.4, 146.5, 73/146.8, 146; 324/558

(56) References Cited

U.S. PATENT DOCUMENTS

| 1,779,907 A | 10/1930 | Dye |
| 2,345,679 A | 4/1944 | Linse |
| 2,378,237 A | 6/1945 | Morris |
| 2,503,992 A | 4/1950 | Becker |
| 2,612,772 A | 10/1952 | McConnell |
| 2,753,521 A | 7/1956 | Abrams |
| 2,940,305 A | 6/1960 | Williams |
| 2,941,144 A | 6/1960 | Cannon |
| 3,056,286 A | 10/1962 | Gibson |
| 3,148,535 A | 9/1964 | Lemelson |
| 3,228,232 A | 1/1966 | Proctor |
| 3,238,767 A | 3/1966 | Clynes |
| 3,285,059 A | 11/1966 | Bogle |
| 3,336,794 A | 8/1967 | Wysoczanski |
| 3,350,924 A | 11/1967 | King |
| 3,354,700 A | 11/1967 | Schindler |
| 3,367,173 A | 2/1968 | Uphoff |

(List continued on next page.)

Primary Examiner—Edward Lefkowitz
Assistant Examiner—Andre Allen
(74) Attorney, Agent, or Firm—Patterson, Thuente, Skaar & Christensen, P.A.

(57) ABSTRACT

An apparatus for detecting a flaw in a tire includes a voltage generator producing a high voltage pulse on an electrical conductor. The electrical conductor is oriented with respect to the tire to establish an electric field within the tire. Relative motion between the tire and the electrical conductor occurs such that an electric arc extends from the electric field through a flaw when a flaw is proximate the electric field. A flaw detection circuit is capacitively coupled to the electrical conductor and receives a signal indicative of a voltage signal on the electrical conductor. The circuit further includes means for determining if the frequency of the received signal is greater than a predetermined threshold frequency, and if so, producing an indicator signal indicating the presence of the flaw.

17 Claims, 3 Drawing Sheets

U.S. PATENT DOCUMENTS

| | | |
|---|---|---|
| 3,371,524 A | 3/1968 | Wloszek |
| 3,384,733 A | 5/1968 | Burbank |
| 3,456,495 A | 7/1969 | Stinger |
| 3,465,242 A | 9/1969 | Gruetzmacher |
| 3,552,190 A | 1/1971 | Lefebvre |
| 3,555,889 A | 1/1971 | Weighart |
| 3,576,126 A | 4/1971 | Weighart |
| 3,593,120 A | 7/1971 | Mandula |
| 3,604,249 A | 9/1971 | Wilson |
| 3,631,849 A | 1/1972 | Norris |
| 3,646,805 A | 3/1972 | Walters |
| 3,665,754 A | 5/1972 | Krautkramer |
| 3,670,562 A | 6/1972 | Muto |
| 3,712,119 A | 1/1973 | Cross |
| 3,780,570 A | 12/1973 | Collins |
| 3,786,673 A | 1/1974 | Weissmann |
| 3,794,964 A | 2/1974 | Katakura |
| 3,812,708 A | 5/1974 | Cowan |
| 3,815,407 A | 6/1974 | Lavery |
| 3,871,210 A | 3/1975 | Himmler |
| 3,872,715 A | 3/1975 | Pittaro |
| 3,882,717 A | 5/1975 | McCauley |
| 3,918,025 A | 11/1975 | Koshikawa |
| 3,967,498 A | 7/1976 | Pezzillo |
| 3,978,712 A | 9/1976 | Cowan |
| 3,981,184 A | 9/1976 | Matay |
| 4,059,989 A | 11/1977 | Halsey |
| 4,065,958 A | 1/1978 | Krylova |
| 4,083,232 A | 4/1978 | Heyser |
| 4,088,028 A | 5/1978 | Hildebrandt |
| 4,089,225 A | 5/1978 | Kraska |
| 4,089,226 A | 5/1978 | Kraska |
| 4,117,733 A | 10/1978 | Gugel |
| 4,274,289 A | 6/1981 | Weiss |
| 4,279,157 A | 7/1981 | Schomberg |
| 4,285,235 A | 8/1981 | Dugger |
| 4,297,876 A | 11/1981 | Weiss |
| 4,327,579 A | 5/1982 | Weiss |
| 4,337,660 A | 7/1982 | Weiss |
| 4,365,514 A | 12/1982 | Ho |
| 4,372,366 A | 2/1983 | Dugger |
| 4,516,068 A | 5/1985 | Hawkinson, Jr. |
| 4,520,307 A | 5/1985 | Weiss |
| 6,050,136 A | 4/2000 | Hawkinson |
| 6,304,090 B1 | 10/2001 | Weiss |

METHOD AND APPARATUS FOR TIRE FLAW DETECTION

CROSS-REFERENCE TO RELATED APPLICATIONS

This application claims the priority of provisional application Ser. Nos. 60/370,170, filed on Apr. 5, 2002, titled "Improved Detector and Method for Electronic Testing of Tires" and 60/371,033, filed on Apr. 9, 2002, titled "Method and Apparatus for Tire Flaw Detection."

FIELD OF THE INVENTION

The present invention relates generally to an apparatus for detecting flaws in tires and, more specifically, to a high voltage electric arc testing apparatus and a flaw detection circuit for indicating the presence of tire flaws.

BACKGROUND OF THE INVENTION

Visual examination is often performed on used tires prior to the retreading process. The purpose of the visual examination is to identify tires with flaws such as cuts, holes, and nails or the like imbedded therein. It is essential that the visual examination be time efficient, yet reliable. Identified flaws in tires may be repaired prior to the tires being buffed and retreaded.

While visual examination is often reasonably accurate, flaws are frequently missed due to human error or to the absence of visual evidence of the flaws. Undetected flaws may give rise to defective retreads by allowing high pressure air to flow through the flaws and into the tire structure, causing separation of tire components, heat, and generally degradation of the tire. Any of these defects may give rise to the failure of the tire either in the retread shop or during use on the road.

As alternatives to visual examination, one class of machines detects holes in inflated tires immersed in a liquid. Escaping air from these holes may be directly observed in the form of bubbles.

U.S. Pat. Nos. 4,297,876 and 4,327,579 disclose ultrasonic tire testing apparatus for detecting separations and/or holes in vehicle tires. The system disclosed therein employs a through transmission method of ultrasonic inspection. An ultrasonic transmitter array and an ultrasonic receiver array are both mounted in a non-contacting, non-critical relationship with the tire undergoing inspection. The inspection is performed during a single tire revolution. The ultrasonic transmitters are pulsed and the receivers are sampled at predetermined time intervals. The predetermined time intervals are related to the transmitter/receiver/tire geometry. The method and apparatus disclosed eliminate potential problems of talk-around and standing waves. The problem of transmitter-transmitter interference is eliminated by transmitter frequency separation and transmitter array pointing geometry. The problem wherein tread pattern fluctuations in the received signal interfere with flaw detection is eliminated by the use of a finite sample data filter with a period adjusted to the period of the tread pattern.

U.S. Pat. No. 4,520,307, hereby incorporated by reference, discloses a high voltage tire testing apparatus for detecting nails, cuts and/or holes in vehicle tires. The apparatus employs a high voltage head mounted within the tire and a reference head disposed outside the tire opposite the high voltage head. The high voltage head and reference head span the tire tread axially. The inspection may be performed in one tire revolution with high voltage pulses that are impressed upon the high voltage head. The amplitude and pulse widths of the high voltage pulses are variably selected to be commensurate with the type of tire being examined. When a nail, cut, or hole in the tire passes between the high voltage head and the reference head, an electric arc forms and current passes through the tire. The arc may be visually observed or electronically detected via an electronic detection circuit in which a lamp lights and the tire rotation is stopped when a flaw is encountered. The flaw may then be located manually.

U.S. Pat. No. 6,304,090, hereby incorporated by reference, also discloses a high voltage tire testing apparatus. The apparatus disclosed therein detects tire flaws using tire spreaders and rotating apparatus that are generally already present in a facility for retreading tires. In one embodiment, the high voltage tire testing apparatus includes a frame that is sized to fit in the interior of the tire. The frame includes a probe or pin and front and rear frame wheels. The probe or pin is electrically connected to a high voltage source to create a high voltage field near the inner surface of the tire. If the tire testing apparatus is operated on a tire rotation stand with rollers, the rollers are in electrical contact with the voltage source and, for example, grounded. Operationally, the frame is inserted into the interior of a tire to be examined for flaws and the tire is rotated. During rotation, the frame wheels maintain the tester frame, and hence the probe, near or at the bottom of the tire. Upon encountering a flaw in the tire, an electric arc is generated through the flaw between the probe and the grounded roller. The person conducting the examination sees and hears the arc and thereby detects the tire flaw. However, in noisy facilities, seeing and/or hearing the arc becomes more difficult. Therefore, tire flaws "detected" by this apparatus may not be observed by the person conducting the examination and tires with unrepaired flaws may be recapped. These flawed recapped tires pose dangers to users and sources of liability to persons recapping tires. Therefore, a flaw detection apparatus is needed that provides an indication of a tire flaw in addition to the observation of a generated electrical arc.

SUMMARY OF THE INVENTION

The present invention may be characterized as a flaw detection device for use with a high voltage tire testing apparatus. A high voltage tire testing apparatus uses a generator for generating high voltage pulses to create a high voltage field near an electrical conductor.

In a preferred embodiment of the invention, a wire is capacitively coupled to the high voltage electrical conductor. It has been noted that a frequency up shift of large magnitude occurs at the electrical conductor during arcing conditions, and that the frequency of the resultant signal can be predicted. The signal on the wire is input to a filter that is tuned to pass only frequencies above a predetermined threshold frequency. The threshold frequency is determined to be below the frequency predicted for the signal at the electrical conductor during arcing conditions, and substantially above the normal pulse frequency of the high voltage signal impressed on the electrical conductor by the high voltage generator. The output of the filter may then be rectified and supplied to a comparator stage, wherein the rectified output is compared to a preselected amplitude value. The comparator produces a flaw indicator signal if an arcing condition is present. The output signal from the comparator then initiates a response such as lighting a lamp, activating a sound-emitting device, or stopping the tire rotation.

It is understood that the above-described figures are only illustrative of the present invention and are not contemplated to limit the scope thereof.

DETAILED DESCRIPTION OF THE DRAWINGS

Figure 1:
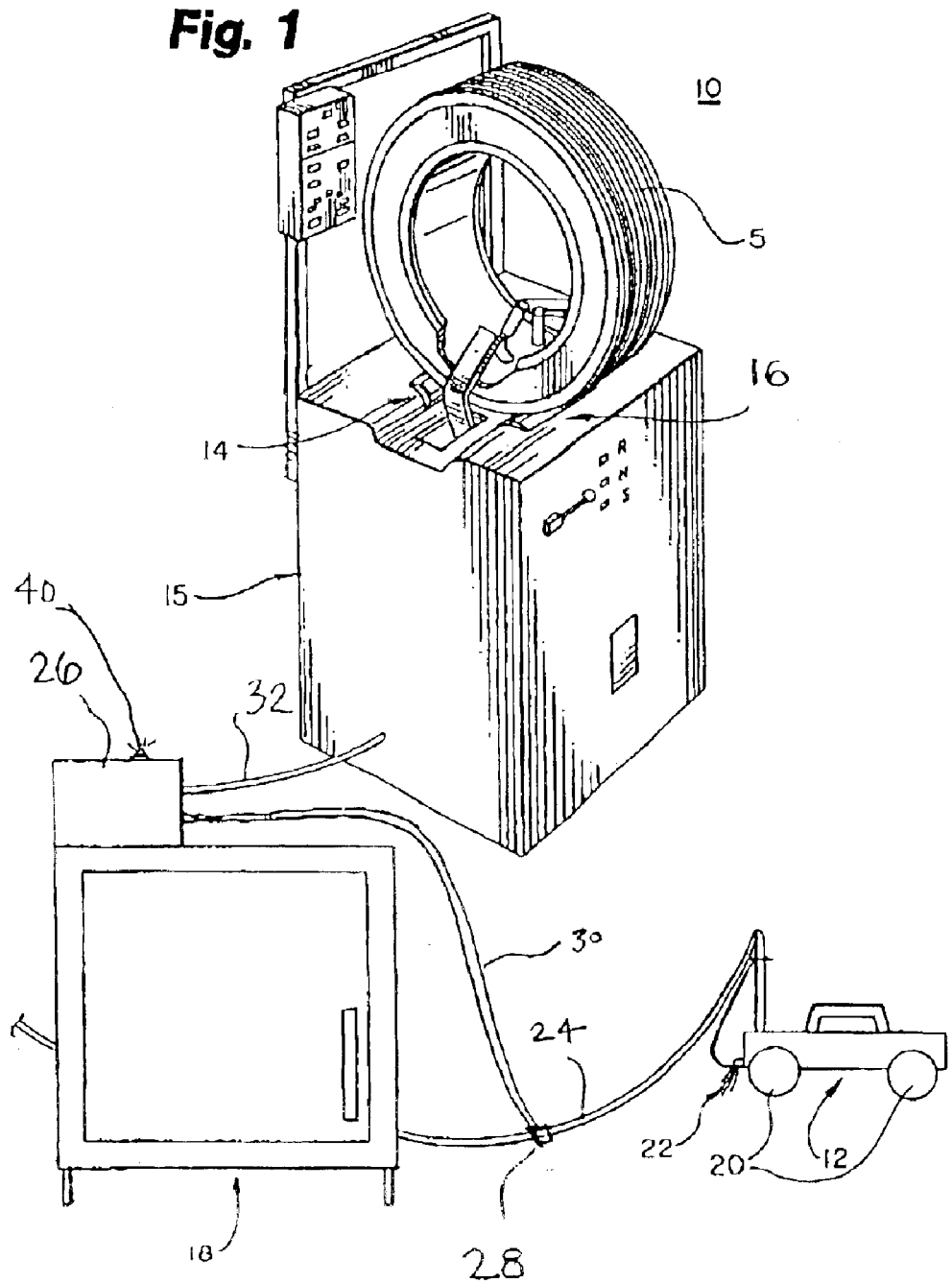
FIG. 1 illustrates a high voltage tire testing apparatus.

FIG. 1 illustrates the preferred embodiment of a high voltage tire testing apparatus 10 for the purposes of illustration and to enable a more complete understanding of the invention. It will be appreciated that use of the present invention is not limited to any particular high voltage tire testing apparatus, but that the invention is usable with any tire testing apparatus that uses electrical arcing for detecting flaws. Tire testing apparatus 10 generally comprises a high voltage head 12 and a voltage generator 18. The high voltage head 12 may contain at least one wheel 20 and at least one probe 22 which may be either a pin, chain pin, wire, brush, or any other electrical conductor. In operation, the tire testing apparatus 10 may use a device 16 for rotating a tire 5, such as rollers 14 connected to any variety of motor 15 that rotates the rollers 14. Typically, such a rotating device 16 causes the tire to rotate about a substantially horizontal axis. The rotating device 16 allows relative motion between the tire 5 and the voltage head. Alternatively, the voltage head 12 may be moved with respect to the tire 5.

In operation, the high voltage head 12 is placed in the interior of the tire 5 after the tire 5 has been placed on the rotating device 16. Voltage generator 18 is connected to the high voltage head 12 via an electrical conductor 24 so as to create an electric field in the probe 22 near the high voltage head 12. When the tire 5 is rotated using the rotating device 16, the high voltage head 12 rolls on wheels 20 so as to remain in substantially the same position within the tire 5. The inside of the tire 5 therefore moves with respect to the high voltage head 12 such that a given point on the interior surface of the tire 5 will eventually travel in a full circle with respect to the high voltage head 12. The voltage generator 18 creates an electric field near the interior surface of the tire 5. The tire 5, and particularly the inside surface of the tire, is a good insulator and upon detection of a flaw, such as a hole in the tire 5 or a nail, current will flow from the probe 22 of the high voltage head 12 to the rollers 14 and this current will generally be visible as an electric arc or spark. By way of example, the voltage generator 18 may use a capacitive discharge circuit to generate high voltage pulses at a predetermined frequency. For example, a generated pulse has a pulse width of approximately 500 nsec and a voltage amplitude of approximately 20,000 to 60,000 volts, which is generally sufficient to cause arcing conditions at any flaws in the tire 5.

Flaw detection device 26 of the present invention is illustrated generally in FIG. 1. Device 26 electrically detects the presence of an electrical arc at the high voltage head 12. During arcing conditions, the signal on the wire 24 includes a high frequency component, and flaw detection device 26 includes a circuit for determining if the signal on the wire 24 is greater than a predetermined threshold frequency. The signal on wire 24 is coupled to device 26 via lead 30 and capacitive coupling 28. Capacitive coupling 28 is preferably accomplished with a small piece of metal such as foil (approximately 1 square inch in area) that is attached to the insulator of the wire 24, but may be any other device that acts to capacitively couple lead 30 to the signal on wire 24. It is currently preferred that capacitive coupling 28 provide about 10 microfarads of capacitive coupling, but any amount of coupling sufficient to provide a detectable signal to device 26 is within the scope of the present invention. Only a small amount of capacitive coupling is necessary to provide a strong signal to device 26 because of the magnitude of the high voltage pulses produced by the generator and present on wire 24. The device 26 is also connected via a wire 32 to the motor 15 driving the rollers 14, and optionally to indicator light 40 to provide a visual indication of a flaw.

Figure 2:
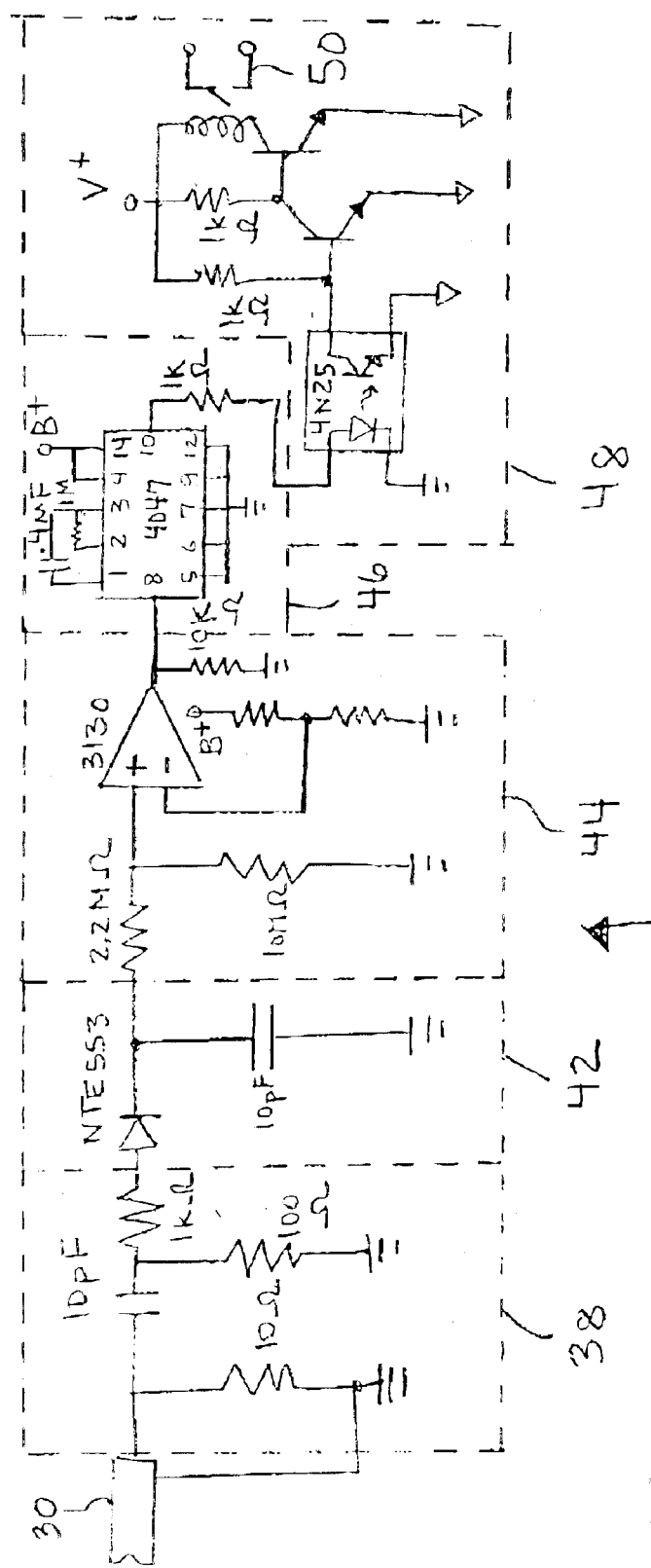
FIG. 2 illustrates a first embodiment of a flaw detection circuit in accordance with the present invention.

As shown in FIG. 2, the signal on wire 24 is capacitively coupled through lead 30, preferably a coaxial cable, to the input of a high frequency filter 38. As shown, high frequency filter 38 is a conventional high pass RC filter that is tuned to pass frequencies above a predetermined cutoff or threshold frequency. It is currently preferred that the predetermined threshold frequency be approximately 1 MHz. The output of high frequency filter 38 is passed to rectifier 42 and the rectified signal output from rectifier 42 is passed to voltage comparator 44. Voltage comparator 44 compares the output of rectifier 42 to a reference voltage. Voltage comparator 44 is shown as an operation amplifier, but may be any type of circuit that will generate an output signal based on the relative comparison of voltages. The output of comparator 44 is coupled to a mono-stable multi-vibrator 46 whose output is in turn coupled through isolator 48 to relay stage 50.

Referring now to both FIGS. 1 and 2, the operation of the invention can be understood. Under normal conditions with high voltage head 12 energized and with no flaw present, only the normal high voltage pulses are present on wire 24 at a frequency of the generated high voltage pulses. This frequency is substantially below the predetermined threshold frequency of the high frequency filter 38 such that no signal is present at the output of the filter 38 when no arcing is present.

However, when arcing occurs due to a presence of a flaw in the tire 5, a higher frequency signal is present on wire 24 and coupled to lead 30. This higher frequency is above the predetermined threshold frequency. The high frequency filter 38 allows this higher frequency signal to pass. The signal is then rectified at rectifier stage 42 and applied to the input of voltage comparator stage 44. If the signal at the input of the comparator 44 is above a preselected amplitude, the output of the comparator switches, for example, from low to high, producing an indicator signal. In other words, the comparator acts as a discriminator such that only signals on the wire 24 having a voltage amplitude greater than the preselected amplitude causes the flaw detection device 26 to produce an indicator signal. This prevents transient or noise signals from producing an indicator signal.

The change in the output of comparator 44 triggers the mono-stable multi-vibrator 46, causing it to produce an output pulse. This output pulse passes through isolator stage 48 to a relay stage 50. The relay stage 50 can be used to control any desired action, such as lighting the light 40, sounding a horn or buzzer, or stopping the device 16 for rotating the tire.

Figure 3:
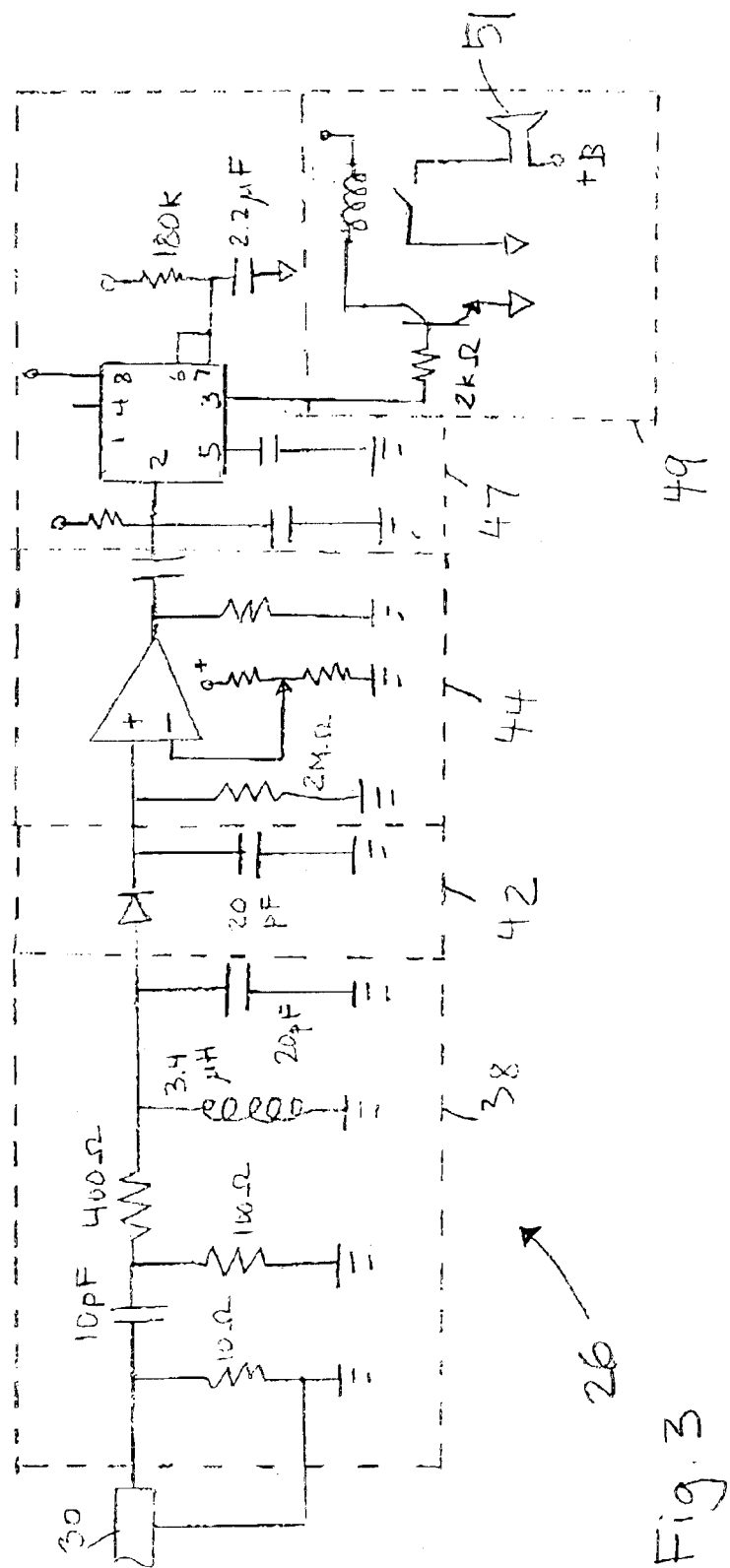
FIG. 3 illustrates a second embodiment of a flaw detection circuit.

A second embodiment of flaw detection device 26 is illustrated in FIG. 3. As shown in FIG. 3, the signal on wire 24 is capacitively coupled through lead 30, preferably a coaxial cable, to the input of a high frequency filter 38 having a predetermined threshold frequency. The output of filter 38 is passed to rectifier 42 and the output of rectifier 42 is passed to voltage comparator 44. Voltage comparator 44 compares the rectified signal output from rectifier 42 to a reference voltage. The output of comparator 44 is coupled to a one-shot circuit 47 whose output is in turn coupled to output circuit 49 for activating a sound-emitting device 51. In operation, the flaw detection device 26 illustrated in FIG. 3 is similar to that described above with respect to FIG. 2.

Because numerous modifications of this invention may be made without departing from the spirit thereof, the scope of the invention is not to be limited to the embodiments illustrated and described. Rather, the scope of the invention is to be determined by the appended claims and their equivalents. Any references to such relative terms as front and back, right and left, top and bottom, upper and lower, horizontal and vertical, or the like, are intended for convenience of description and are not intended to limit the present invention or its components to any one positional or spatial orientation. All dimensions of the components in the attached figures may vary with a potential design and the intended use of an embodiment of the invention without departing from the scope of the invention.

What is claimed is:

1. An apparatus for detecting a flaw in a tire, comprising:
   a voltage generator producing a high voltage pulse at a first frequency less than a predetermined threshold frequency;
   an electrical conductor receiving the high voltage pulse and oriented with respect to the tire to establish an electric field within the tire;
   means for effecting relative motion between the tire and the electrical conductor such that an electric arc extends from the electric field through the flaw when the flaw is proximate the electric field; and
   a flaw detection device coupled to the electrical conductor and receiving a signal indicative of a voltage signal on the electrical conductor, the device including a circuit for determining if the frequency of the received signal is greater than the threshold frequency, and if so, producing an indicator signal indicating the presence of the flaw.

2. The apparatus of claim 1, wherein the flaw detection device includes means for capacitively coupling the voltage signal on the electrical conductor to the frequency determining circuit.

3. The apparatus of claim 2, wherein the means for capacitively coupling includes a piece of foil proximate the electrical conductor and a coaxial conductor connected to the foil.

4. The apparatus of claim 2, wherein the device further includes a circuit for determining if the amplitude of the received signal is greater than a preselected value and indicating the presence of the flaw only if the received signal has an amplitude greater than the preselected value.

5. The apparatus of claim 2, wherein the device further includes a lamp and the indicator signal activates the lamp.

6. The apparatus of claim 2, wherein the device further includes a sound-emitting device and the indicator signal activates the sound-emitting device.

7. The apparatus of claim 2, wherein the indicator signal is coupled to the means for effecting relative motion and the relative motion is stopped upon detection of the flaw.

8. The apparatus of claim 1, wherein the device further includes a circuit for determining if the amplitude of the received signal is greater than a preselected value and indicating the presence of the flaw only if the received signal has an amplitude greater than the preselected value.

9. The apparatus of claim 1, wherein the device further includes a lamp and the indicator signal activates the lamp.

10. The apparatus of claim 1, wherein the device further includes a sound-emitting device and the indicator signal activates the sound-emitting device.

11. The apparatus of claim 1, wherein the indicator signal is coupled to the means for effecting relative motion and the relative motion is stopped upon detection of the flaw.

12. An apparatus for detecting a flaw in a tire, comprising:
    a voltage generator producing a high voltage pulse at a first frequency less than a predetermined threshold frequency;
    an electrical conductor receiving the high voltage pulse and oriented with respect to the tire to establish an electric field within the tire;
    means for effecting relative movement between the tire and the electrical conductor such that an electric arc extends from the electric field through the flaw when the flaw is proximate the electric field; and
    a flaw detection circuit capacitively coupled to the electrical conductor and receiving a signal indicative of a voltage signal on the electrical conductor, and including means for determining if the frequency of the received signal is greater than the threshold frequency, and means for determining if the amplitude of the received signal is greater than a predetermined value, and if both conditions are met, producing an indicator signal indicating the presence of the flaw.

13. A method for detecting a flaw in a tire, the method comprising:
    placing an electrical conductor within the tire;
    applying a high voltage pulse at a first frequency to the electrical conductor;
    effecting relative movement between the tire and the electrical conductor such that when a flaw is located between the electrical conductor and an electrical ground, an arc is generated in response to the presence of the flaw; and
    detecting if the frequency of a voltage signal on the electrical conductor is above a predetermined threshold frequency, and if so, indicating the presence of the flaw.

14. The method of claim 13, wherein the presence of the flaw is indicated by lighting a lamp.

15. The method of claim 13, wherein the presence of the flaw is indicated by a sound-emitting device.

16. The method of claim 13, wherein the presence of the flaw is indicated by stopping the tire rotation.

17. The method of claim 13, further including the step of detecting if the amplitude of a voltage signal on the electrical conductor is above a predetermined value, and if so, indicating the presence of the flaw by lighting a lamp, activating a sound-emitting device, or stopping the tire rotation.

* * * * *